Aug. 25, 1964     W. T. FLEMING     3,145,579

MECHANICAL POWER TRANSMISSION UNIT

Filed July 6, 1961     2 Sheets-Sheet 1

INVENTOR
WILLIAM T. FLEMING
BY
J. William Carson
ATTORNEY

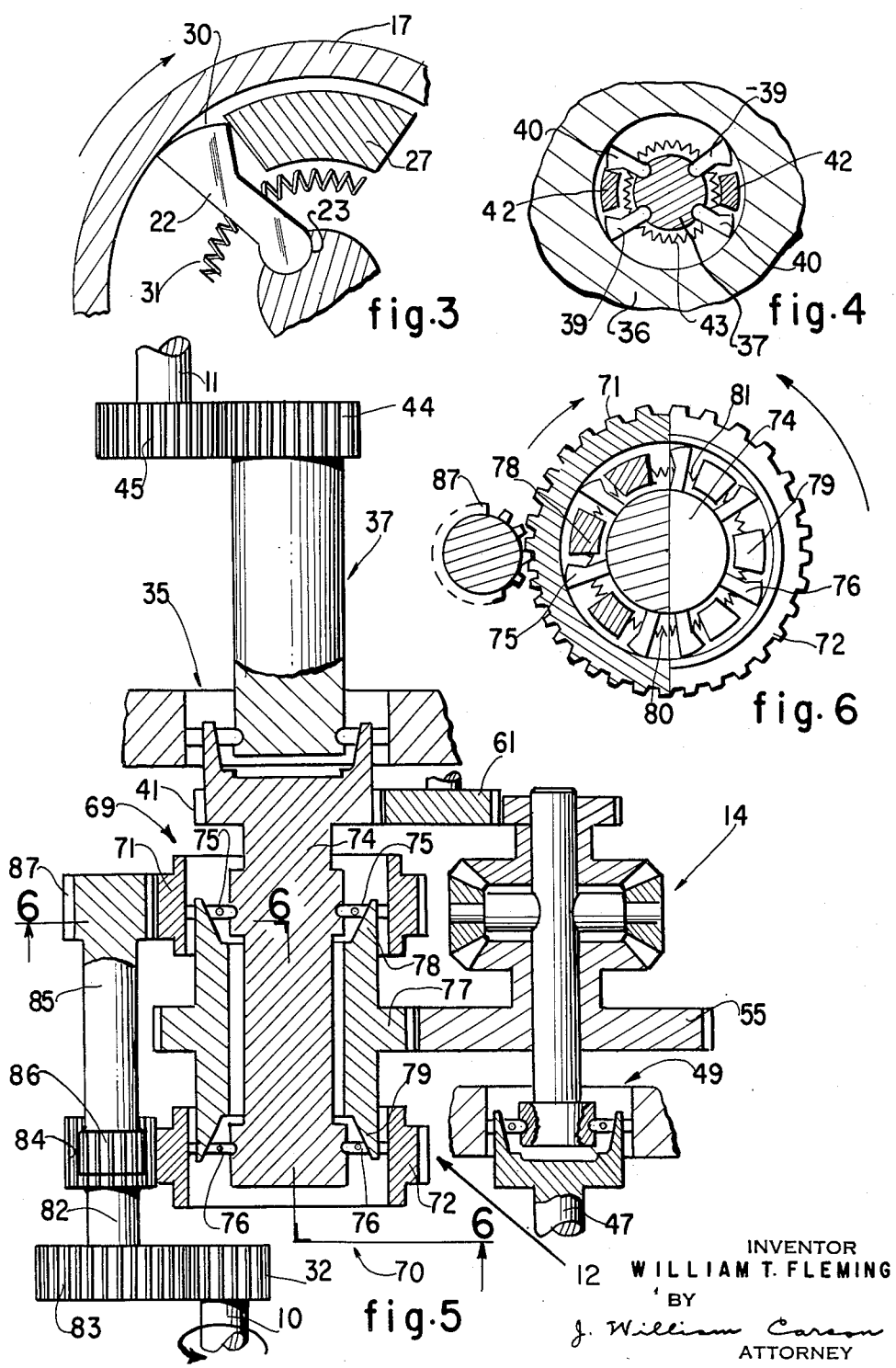

United States Patent Office 3,145,579
Patented Aug. 25, 1964

3,145,579
MECHANICAL POWER TRANSMISSION UNIT
William T. Fleming, Boonton, N.J., assignor to Specialties Development Corporation, Belleville, N.J., a corporation of New Jersey
Filed July 6, 1961, Ser. No. 122,204
8 Claims. (Cl. 74—388)

The present invention relates to units for transmitting mechanical power, and, more particularly, to such units wherein the output member follows the motion of a control member and exerts a torque greater than that applied to the control member.

There have been developed in the past, mechanical power transmission units of this type wherein the power of a driven shaft is transmitted to an output shaft through friction clutches which are actuated by a control member.

These friction clutches operate on the principle of the capstan and include a band of high coefficient of friction material wrapped about the driven shaft. One end of the band is attached to the control member and the other end is attached to the output member. The control member applies tensile force to the band, drawing the band tightly about the driven shaft to provide frictional engagement therebetween. The band rotates with the driven shaft and transmits the torque of the driven shaft to the output shaft.

Because these devices rely on the frictional force developed between the band and the driven shaft, the driving connection between the driven shaft and the output shaft is dependent upon the magnitude of the torque on the control member, the materials used, the condition of the surfaces of the band and the driven shaft, the lubricant used and the temperature thereof, and the speed of the driven shaft. Also, the time required to establish a slip free connection between the driven and output shafts is further dependent upon the rate at which the control torque is applied. These devices, therefore, tend to be unstable and inconsistent in operation and thus are not satisfactory for many applications.

Accordingly, an object of the present invention is to provide a mechanical power transmission unit which is not subject to the aforementioned difficulties.

Another object is to provide such a unit which has rapid response and transmits power without slippage.

Another object is to provide such a unit wherein the clutch between the driven and output members responds only to the presence or absence of a control torque.

Another object is to provide such a unit wherein the driving connection between the driven and output members is independent of variations in the torque applied to the control member.

Another object is to provide such a unit wherein the output member is positively locked to the driven member by the initial movement of the control member.

Another object is to provide such a unit wherein the driven and output members are automatically unlocked when the motion of the control member stops.

A further object is to provide such a unit wherein the driven and output members are moved into and out of engagement by forces exerted by the driven member.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention the foregoing objects are accomplished by providing a mechanical power transmission unit including the combination of a continuously driven rotatable input power member, a rotatable output power member concentric with the input member, a wedge member positioned between the power members and mounted on one of the power members to be moveable between a first position wherein the members are free to rotate with respect to each other and a second position wherein the members are locked against rotation, a rotatable control shaft, and control means responsive to the rotation of the shaft for placing the wedge member in the second position only during the rotation of the shaft.

Preferred embodiments of the invention have been chosen for purposes of illustration and description, and are shown in the accompanying drawings, forming a part of the specification, wherein:

FIG. 3 is an enlarged view of a portion of FIG. 2 illustrating details of the mechanism therein.

FIG. 4 is a sectional view taken along line 4—4 on FIG. 1.

FIG. 5 is a schematic, longitudinal sectional view of a modification of the unit shown in FIG. 1.

FIG. 6 is a sectional view taken along line 6—6 on FIG. 5.

Figure 1:
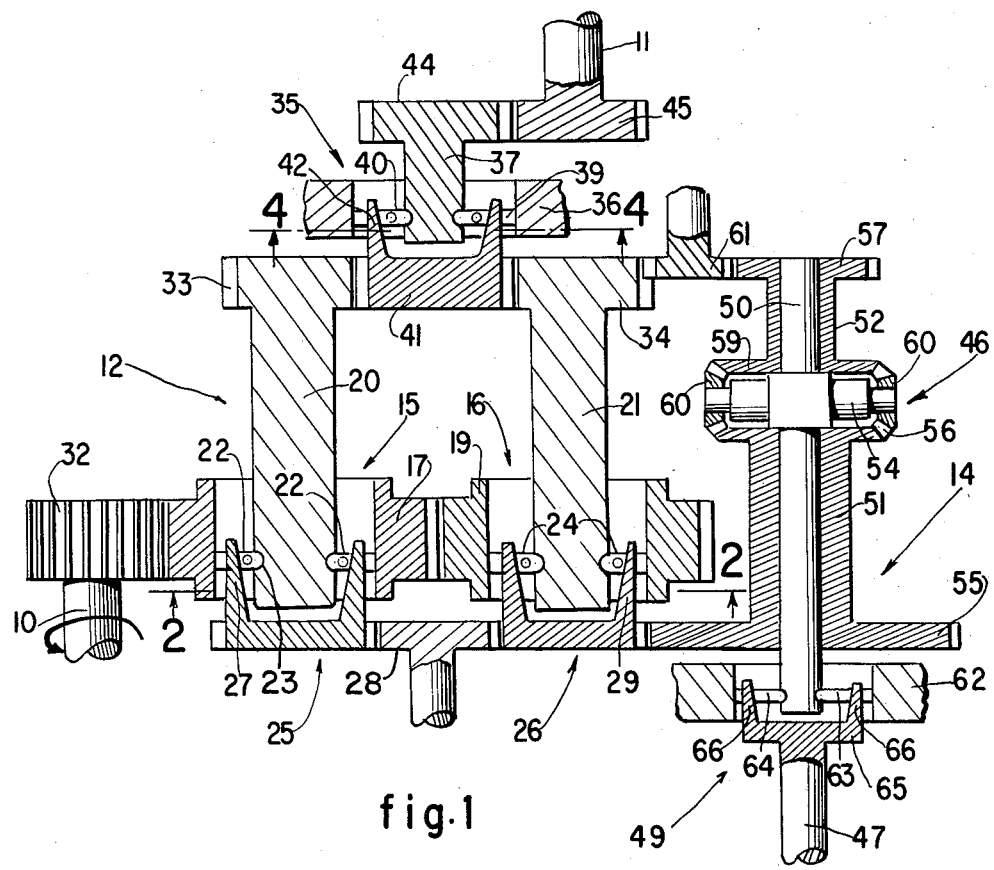
FIG. 1 is a schematic, longitudinal, sectional view of one embodiment of a mechanical power transmission unit in accordance with the present invention.

Referring to the drawings in detail, and more particularly to FIGS. 1 to 4, there is shown one embodiment of a mechanical power unit in accordance with the present invention which generally comprises a power input shaft 10, a power output shaft 11, a power transmission unit 12, and a transmission control unit 14.

The transmission unit 12 includes a pair of clutches 15 and 16 each comprising an outer race-like power input member 17 and 19, respectively, a central power output shaft 20 and 21, respectively, a plurality of wedges or sprags 22 and 24, respectively, and a sprag positioning gear 25 and 26, respectively. The sprags 22 and 24 are pivotally mounted in sockets 23 provided on the lower end of the central shafts 20 and 21 and extending outwardly toward the inner surface of the power input members 17 and 19. The sprag positioning gears 25 and 26 are positioned below the shaft 20, 21 and are respectively provided with a plurality of control fingers 27 and 29 extending upwardly between the power input members and the central shafts to operate on the sprags and control their pivotal position. An idler gear 28 engages the gears 25 and 26 to provide a driving connection therebetween.

As shown in FIG. 3 the sprags 22 of the clutch 15 are formed with an outer surface 30 which is curved in a manner such that the distance from the axis of rotation of the sprag to various points on the surface 30 gradually increases from one edge of the sprag to the other. Therefore, the distance from the axis of the shaft 20 to the most distant point on the surface 30 varies with the rotational position of the sprag 22. Thus, the sprags 22 can be pivoted from a position wherein they wedge against the race-like input member to lock the shaft 20 to the member 17. A contracting coil spring 31 threaded through each sprag holds the sprags in their sockets and urges them toward an upright position, as viewed. The sprags 24 of the clutch 16 are similarly formed but are mounted in the reverse postion.

The input power shaft 10 is provided with a gear 32, and the clutch input members 17 and 19 are each provided with external gear teeth about the circumference thereof, the member 17 being intermeshed with the gear 32 and the member 19, whereby the members 17 and 19 are driven in opposite directions by the shaft 19.

The shafts 20 and 21 are respectively provided with a gear 33, 34 on the upper end thereof to drive the output shaft 11 through a reverse torque locking clutch 35.

The reverse torque locking clutch 35 comprises a stationary outer race-like member 36, a central shaft 37, a plurality of sprags 39 for preventing counter-clockwise torque from being transmitted from the shaft 37 to the gears 33 and 34, a plurality of sprags 40 for preventing the transmission of clockwise reverse torque, and a sprag positioning gear 41 having a plurality of control fingers 42 extending between the outer race-like member 36 and the central shaft 37. The sprags 39 and 40 are arranged in opposing pairs to be controlled by common control fingers positioned therebetween. A contracting coil spring 43 is provided to retain the sprags and urge them into an upright position.

The upper end of the shaft 37 is provided with a gear 44 which intermeshes with a gear 45 provided on the shaft 11 and the sprag positioning gear 41 is intermeshed with the gears 33 and 34.

The transmission control unit 14 includes a differential gear assembly 46 and an input control shaft 47 interconnected through a reverse torque locking clutch 49.

The differential gear assembly 46 includes a central input shaft 50 on which are rotatably mounted a pair of gear carrying output members 51 and 52. The shaft 50 is provided with a cross-shaft 54 rigidly attached thereto and extending radially outwardly between the gear carrying output members 51 and 52.

The output member 51 is positioned below the cross shaft 54 and is formed with a large diameter spur gear 55 at the lower end thereof and a bevel gear 56 at the upper end thereof. The output member 52 is positioned above the shaft 54 and is formed with a small diameter spur gear 57 at the upper end thereof and a bevel gear 59 at the lower end. A beveled spur gear 60 is journaled on each end of the cross shaft 54 to intermesh with the bevel gears 56 and 59 of the members 51 and 52.

The reverse torque locking clutch 49 comprises a stationary outer race-like member 62 concentric with and surrounding the lower end of the shaft 50, a plurality of sprags 63 and 64 pivotally mounted on the shaft 50, and a sprag control member 65 connected to the shaft 47 and provided with control fingers 66. The sprags 63 and 64 are arranged in opposing pairs, as described in connection with the clutch 35, to prevent reverse torque from being transmitted from the shaft 50 to the shaft 47, the sprags 63 being arranged to prevent counterclockwise reverse torque and the sprags 64 being arranged to prevent clockwise reverse torque.

In operation, the input power shaft 10 is driven in a counter-clockwise direction, as viewed from below, by a source of mechanical power not shown and rotates the clutch input member 17 in a clockwise direction which in turn rotates the clutch input member 19 in a counter-clockwise direction, as shown by the arrows in FIG. 2. When the control shaft 47 is stationary, the sprags 22 and 24 are in light frictional contact with the inner surface of the outer races and are prevented from being moved into a locking position by the control fingers 27 and 29.

In order to transmit power from the input power shaft 10 to the output power shaft 11, the control shaft 47 is rotated to cause the differential assembly to rotate the control fingers 27 and 29 with respect to the shafts 20 and 21.

Figure 2:
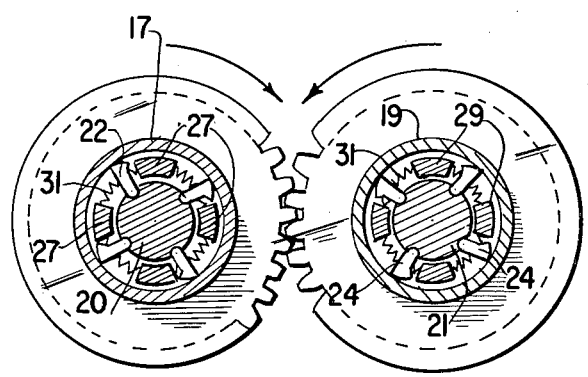
FIG. 2 is a sectional view taken along line 2—2 on FIG. 1.

As shown in FIG. 2 when the control fingers 27 and 29 are rotated clockwise with respect to the shafts 20 and 21, the sprags 22 move into locking engagement with the clutch input member 17 while the sprags 24 are moved out of engagement with the clutch input member 19. The shaft 20 is thereby locked to the member 17 and is driven in a clockwise direction. In like manner, when the control fingers 27 and 29 are rotated counter-clockwise with respect to the shafts 20 and 21, the sprags 24 move into locking engagement with the member 19. The shaft 21 is thereby locked to the member 19 and is driven in a counter-clockwise direction.

The driven shaft 20 or 21 drives the sprag positioning gear 41 of the reverse locking clutch 35 thereby causing the control fingers 42 to engage one set of sprags 39 or 40 and rotate the shaft 37. As shown in FIG. 4, the sprags engaged by the control fingers 42 are rotated to a position out of engagement with the race 36 and the resulting motion imparted to the shaft 37 prevents the other set of sprags from being moved into wedging contact with the race 36. The torque applied to the gear 41 is therefore transmitted to the shaft 37 and through the gears 44 and 45 to the shaft 11.

When a reverse torque is developed on the shaft 11 which is of greater magnitude than the torque delivered thereto through the clutch 35, the shaft 37 rotates relative to the control fingers 42 forcing one set of sprags into locking engagement with the race 36. The reverse torque is thus prevented from being transmitted through the clutch 35.

The direction of displacement of the control fingers 27, 29 with respect to the shafts 20, 21 is determined by the direction of rotation of the control shaft 47. When the control shaft 47, and the shafts 50 and 54 are rotated in a clockwise direction (as viewed from below), the gear carrying output members 51 and 52 interconnected shaft 50 and effect rotation of the control fingers 27 and by the gears 56 are rotated in the same direction as the 29 in a counter-clockwise direction with respect to the shafts 20 and 21. On the other hand, when the control shaft 47 is rotated in a counter-clockwise direction, clockwise rotation of the control fingers 27 and 29 with respect to the shafts 20 and 21 is effected.

The over all gear ratio from the gear 56 of the differential through the clutches 15 and 16 to the gear 59 is slightly less than unity, whereby it is necessary for the control shaft 47 to be continuously rotated in order to maintain the phase shift between the control fingers 27, 29 and the shafts 20, 21 which is required to keep the sprags 22 or 24 in a locked position.

When the motion of the control shaft 47 is stopped, the shaft 21 drives the output member 52 through the idler gear 61, and the output member 51 is in turn driven through the spur gears 60 to rotate the sprag positioning gears 25 and 26. The sprag positioning gears 25 and 26 are rotated in the same direction as the shafts 20 and 21, however, because of the overall gear ratio the gears 25 and 26 are driven at a slower rate and the locked sprags are contacted by the slower moving control fingers and are moved out of the locked position to place the clutches 15 and 16 in a neutral position.

The reverse torque clutch 49 operates in the same manner as the clutch 35 to prevent the reverse torque developed on the shaft 50 from being transmitted to the control shaft 47.

In FIGS. 5 and 6 there is shown another embodiment of a mechanical power unit in accordance with the present invention, wherein the power transmission unit 12 includes a pair of coaxial clutches 69 and 70 having outer input members 71, 72, respectively, which are longitudinally spaced along a common central shaft 74. The shaft 74 carries a set of sprags 75 for the clutch 69 and a second set of sprags 76 for the clutch 70, and a common annular sprag positioning gear 77 is positioned about the shaft 74 between the input members 71 and 72.

The gear 77 is provided with two sets of control fingers 78 and 79. The fingers 78 extend upwardly between the race 71 and the shaft 74 to control the position of the sprags 75, and the fingers 79 extend downwardly between the race 72 and the shaft 74 to control the position of the sprags 76. Contracting coil springs 80 and 81 are provided to retain and urge the sprags 75 and 76 toward an upright position.

The input shaft 10 is rotated counter-clockwise (as viewed from below), and drives the member 72 in a counter-clockwise direction through a shaft 82 having a gear 83 on one end thereof engaging the gear 32 and a gear 84 on the other end thereof engaging gear teeth on the outer surface of the member 72. The member 71 is driven in the clockwise direction through a shaft 85 having a gear 86 on one end thereof meshed with the gear 84 and a gear 87 on the other end thereof engaging gear teeth on the outer surface of the member 71. The gears 84 and 86, and the gears 86 and 87, have ratio of unity whereby the members 71 and 72 are driven at the same rate.

The sprag positioning gear 77 is meshed with the spur gear 55 of the transmission control unit 14 to control the positioning of the sprag, and the sprag positioning gear 41 of the reverse torque locking clutch 35 is mounted on the upper end of the shaft 74 and is engaged directly by the idler gear 61.

In operation, the rotation of the control shaft 47 acts upon the transmission control unit 14 as described in connection with the embodiment of FIGS. 1 to 4 to effect the rotation of the sprag positioning gear 77 with respect to the shaft 74. Rotation of the gear 77 in the clockwise direction allows the sprag 75 to lock the shaft 74 with the counter-clockwise driven member 72. The rotation of the shaft 74 is transmitted through the clutch 35 to the shaft 11 in the manner described in connection with FIGS 1 to 4.

From the foregoing description, it will be seen that the present invention provides a mechanical power transmission unit which responds rapidly to the movement of a control member to provide a slip-free driving connection between a driven member and an output member and extracts power from the driven member to establish and remove the driving connection.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a mechanical power transmission unit, the combination of a continuously driven rotatable input power member, a rotatable output power member concentric with said input member, a wedge member positioned between said power members and mounted on one of said power members to be movable between a first position wherein said power members are free to rotate with respect to each other and a second position wherein said power members are locked against relative rotation, a rotatable control shaft, and control means for operatively connecting said control shaft to said wedge member to place said wedge member in said second position when said shaft is rotating and for operatively connecting said output power member to said wedge member to drive said wedge member into said first position when the rotation of said control shaft is stopped.

2. In a mechanical power transmission unit, the combination of a continuously driven rotatable input power member, a rotatable output power member concentric with said input member, a wedge member positioned between said power members and pivotally mounted on one of said power members to be rotatable with respect thereto between a first position wherein said power members are free to rotate with respect to each other and a second position wherein said power members are locked against rotation, a wedge positioning member between said power members rotatable about the axis of said power members, a control shaft, and controlling means for operatively connecting said control shaft to said wedge positioning member to place said wedge member in said second position when said shaft is rotating and for operatively connecting said output power member to said wedge positioning member to drive said wedge member into said first position when the rotation of said control shaft is stopped.

3. Apparatus according to claim 2, wherein said controlling means includes reverse torque locking means for said control shaft, and a differential gear mechanism having an input member driven by said control shaft through said locking means and having a first output member in connection with said wedge positioning member and a second output member in connection with said wedge carrying power member.

4. In a mechanical power transmission unit, the combination of a first rotatable input power member continuously rotated in one direction, a second rotatable input power member continuously rotated in the opposite direction, a first rotatable output power member concentric with said first input power member, a second rotatable output power member concentric with said second input power member, a first wedge member positioned between said first input member and said first output member, a second wedge member positioned between said second input member and said second output member, said first wedge member being pivotally mounted on said first output member to be movable between a first position wherein said first input member and said first output member are free to rotate relative to each other and a second position wherein said first input and first output members are locked against rotation, said second wedge member being pivotally mounted on said second output member to be movable between a first position wherein said second input member and said second output member are free to rotate relative to each other and a second position wherein said second input member and said second output member are locked against rotation, wedge positioning means for moving said wedge members between said first and second positions in a manner to place one of said wedge members in said first position when the other of said wedge members is in said second position, a control shaft, and controlling means for operatively connecting said control shaft to said wedge positioning means to place one of said wedge members in said second position when said control shaft is rotated in one direction and to place the other of said wedge members in said second position when said control shaft is rotated in the opposite direction and for operatively connecting said output power members to said wedge positioning means to drive said wedge members from said second position to said first position when the rotation of said control shaft is stopped.

5. Apparatus according to claim 4, wherein said input members are arranged so that the axes thereof are parallel and spaced apart, said wedge positioning means includes a wedge positioning member rotatable about the axis of said first input member and a second wedge positioning member rotatable about the axis of said second input member and means for operatively connecting said wedge positioning members for simultaneous rotation in the same direction, and including output shaft means operatively connected to each of said output members.

6. Apparatus according to claim 5, wherein said controlling means includes an idler gear, reverse torque locking means for said control shaft, and a differential gear mechanism having an input member and first and second output members, said differential input member being driven by said control shaft through said reverse torque locking means, said first differential output member being geared to said wedge positioning members, and said second differential output member being geared to said output power members through said idler gear.

7. Apparatus according to claim 4, wherein said input power members are axially aligned and said output power members are formed on a common shaft and said wedge positioning means includes a wedge positioning member positioned between said input power members and rotatable about the axis of said input power members.

8. Apparatus according to claim 7, wherein said controlling means includes an idler gear, and a differential gear mechanism having an input member and first and second output members, said input member being driven by said control shaft, said first output member being geared to said wedge positioning member, and said second output member being geared to said output power members through said idler gear.

References Cited in the file of this patent

UNITED STATES PATENTS

| | | |
|---|---|---|
| 1,789,254 | Perrin | Jan. 13, 1931 |
| 1,909,831 | Jensen | May 16, 1933 |
| 2,354,703 | Raines et al. | Aug. 1, 1944 |
| 2,569,585 | Small | Oct. 2, 1951 |
| 2,569,586 | Small | Oct. 2, 1951 |
| 2,721,638 | Palm | Oct. 25, 1955 |